UNITED STATES PATENT OFFICE.

CARLETON ELLIS, OF MONTCLAIR, NEW JERSEY.

COMPOSITION FOR TREATING OILS.

1,158,664. Specification of Letters Patent. Patented Nov. 2, 1915.

No Drawing. Application filed July 2, 1915. Serial No. 37,716.

*To all whom it may concern:*

Be it known that I, CARLETON ELLIS, a citizen of the United States, and a resident of Montclair, in the county of Essex and State of New Jersey, have invented certain new and useful Improvements in Composition for Treating Oils, of which the following is a specification.

This invention relates to catalyzers adapted for the hydrogenation of oils and relates in particular to a composition for treating oil containing finely-divided nickel or other hydrogenating catalyst.

When a catalytic substance without supporting material is employed in the hydrogenation of fatty oils, if very finely-divided it will at times be found to offer certain difficulties in filtration. A very fine precipitate of metallic nickel such for example as may be obtained from nickel carbonyl under certain conditions is quite penetrating and may work its way to some degree through the filter cloths of a filter press.

The object of the present invention is to handle such finely-divided material to better advantage during the filtration process especially in those cases where so finely-divided as to approach a colloidal condition, and to remove such metallic material from the oil at a fairly rapid rate of filtration. For this purpose I admix with the nickel material a quantity of fairly fine pumice or other abrasive material of an inert character such as fullers' earth, kieselguhr, short fibered asbestos and the like or I may use a hydrogen occluding material such as particles or granules of charcoal. Relative to the degree of fineness of the metallic particles it may be observed that the abrasive material should ordinarily be of a substantially coarser nature.

When using, for example, nickel carbonyl, the nickel may be precipitated in oil and the hydrogenation of the oily material employed may be carried on for a time solely with the finely-divided metallic catalyst and after a time the abrading material may be added and the operation of adding hydrogen continued to the desired extent or the abrading material may be added at any other suitable stage of the operation prior to filtration. After filtration a press cake of pumice or other abrading material employed, mixed with particles of the nickel catalyzer is obtained and this mixture is returned to the hydrogenation apparatus and used again, in which case additional abrading material is ordinarily not added and the catalyzer with this simple admixture of mineral substance is used repeatedly until the catalyzer is exhausted. Two to five parts of the inert material or abrasive employed as a bulking body may be used to one part of nickel.

The finely-divided nickel is not of course attached to the particles of abrading material and hence the regeneration of spent catalyzer may be carried out in a number of ways. The nickel and abrading material may for example be separated by the flotation process and the metal thus recovered and rehabilitated or magnetic separation may be used in some cases.

In using the term "abrading material" I intend to comprise various mineral or other bulking bodies of a rough fragmentary or fibrous character capable of aid in the filtration of oils containing nickel or other preformed catalyst in a state of extreme subdivision, which abrading material is compatible with the catalyzer employed and the oils which are being treated.

This application is a continuation of Serial No. 695,206 filed May 4, 1912, as regards the use of a bulking agent admixed with a finely divided catalytic metal or material.

What I claim is:—

1. A catalytic composition adapted for hydrogenating oily material containing unsaturated bodies, which consists substantially of finely-divided catalytic nickel material and somewhat coarser bulking material incorporated therewith but substantially unattached thereto.

2. A catalytic composition adapted for hydrogenating oily material containing unsaturated bodies, which comprises finely-divided colloidal nickel material and somewhat coarser inert material incorporated therewith.

3. A catalytic composition adapted for hydrogenating oily material containing unsaturated bodies which comprises a catalyzer consisting substantially of discrete particles of nickel material and a mineral bulking material.

4. A catalytic composition adapted for hydrogenating oily material containing unsaturated bodies which comprises a colloidal catalyzer in simple admixture with inert bulking material.

5. A catalytic composition adapted for hydrogenating oily material containing unsaturated bodies which comprises a colloidal catalyzer in simple admixture with inert mineral bulking material.

6. A catalytic composition adapted for hydrogenating oily material containing unsaturated bodies which consists of discrete particles of catalyzer material comprising colloidal material in admixture with inert bulking material and mechanically separable therefrom.

CARLETON ELLIS.